UNITED STATES PATENT OFFICE.

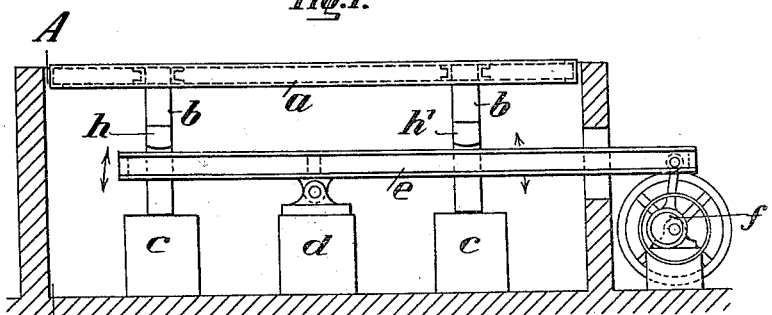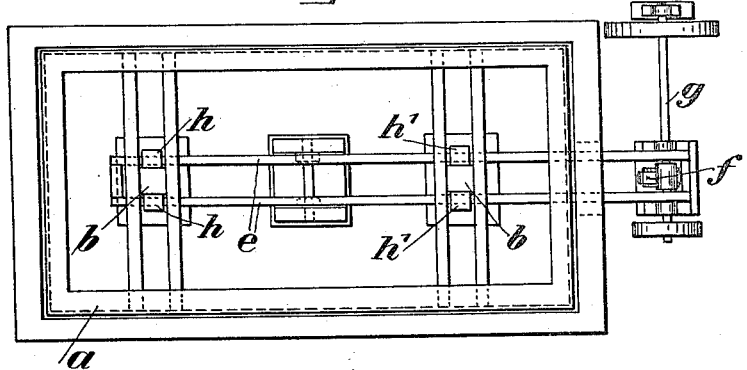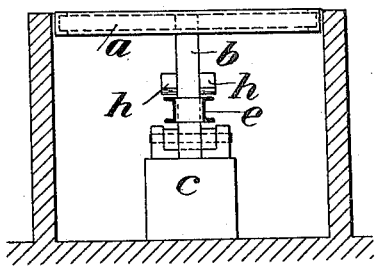

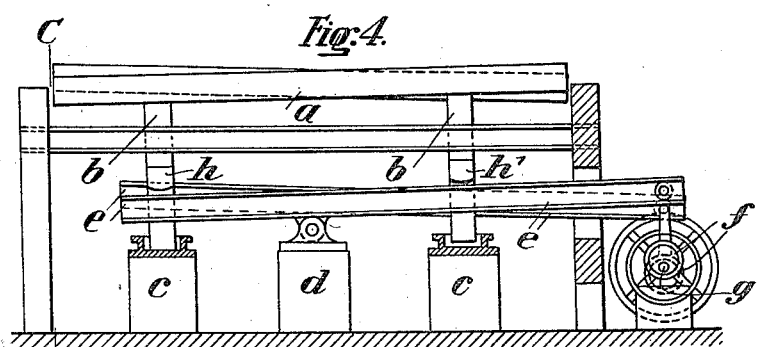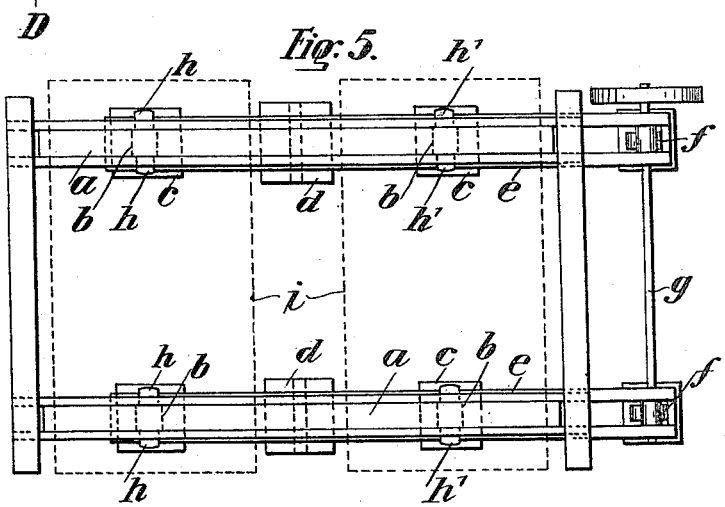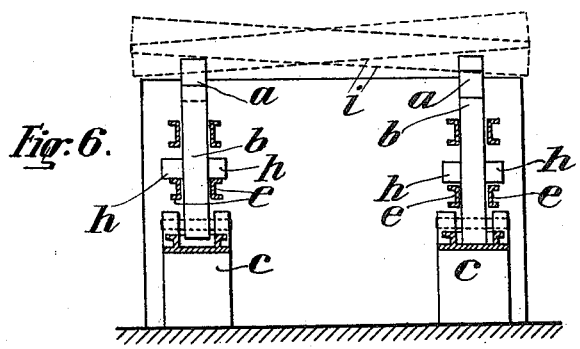

ALBERT FRIESECKE AND CARL FRIESECKE, OF BERLIN, GERMANY.

SHAKING-MACHINE FOR USE IN THE MANUFACTURE OF CONCRETE OR ARTIFICIAL STONE.

1,106,644.

Specification of Letters Patent. Patented Aug. 11, 1914.

Application filed May 9, 1912. Serial No. 696,072.

*To all whom it may concern:*

Be it known that we, ALBERT FRIESECKE and CARL FRIESECKE, subjects of the King of Prussia, residing at Berlin, Germany, have invented new and useful Improvements in Shaking-Machines for Use in the Manufacture of Concrete or Artificial Stone, of which the following is a specification.

This invention relates to a shaking machine for use in the manufacture of blocks or slabs of concrete or artificial stone and has for its object to so shake the molds which are filled with the material to form the concrete or stone, as to remove from the material the air and the surplus moisture.

A machine is already known in which, by regular movements which follow each other, a shaking table supported by a vertical shaft, is raised and then allowed to drop freely, the said shaking table with its shaft being caused to move in a straight line. It is also old to employ shaking tables which swing around vertical shafts and also tables which are turned around or are swung in a horizontal plane and which are caused to shake by being alternately moved upward and jolted and then moved downward but wherein that part of the table which is supported by the shaft is not affected by the jars or jolts.

Under the present invention, the feature of the machine chiefly consists in that the shaking table thereof is not rotatably mounted and is not retarded by any guide means while each end is alternately moved upward and jolted downward at different times.

According to the present invention a movable shaking table is provided in which there are no dead points and the molds resting on the table are subjected at all parts to evenly acting pressure and the weight of the shaking plate as well as of the material being acted on, are utilized for producing the desired effect.

A further feature of the invention consists in that the shaking table is moved by rocking beams which act on the legs of the table.

In order that the invention may be clearly understood I have hereunto appended explanatory drawings whereon, by way of example, two forms of machine are illustrated.

Figure 1 is a side view, Fig. 2 is a plan, and Fig. 3 is a sectional end elevation on line A—B of Fig. 1 of one form of machine. Figs. 4 to 6 show similar views of a modification.

A heavy table plate, beam or frame $a$ rests freely with two legs $b$ in bearings on foundations $c$. Pivotally mounted on a third foundation $d$ is a beam $e$, preferably consisting of two channel irons, which beam, at the outer end, is set in rocking motion by an eccentric $f$ on a driving shaft $g$. This beam $e$ is mounted beneath projections $h$ $h^1$, on the legs $b$ and thereby rock the table plate while at the same time the beam $e$ acts as a guide for legs $b$ of the table plate. The mold which is filled with the material to form the concrete or stone is placed on the table plate or frame $a$ and the driving shaft $g$ is set in motion. The rocking motion of the beam $e$ produces alternately at $h$ $h^1$, violent upward impulses and jolting of the legs in their bearing on the foundations $c$ thereby thoroughly shaking the material in the mold which is placed on the table plate $a$ and is kept in constant motion until by gravity a complete setting of all the particles has taken place, and the surplus moisture as well as the air is separated from the mixture.

The modification illustrated at Figs. 4 to 6 differs from that described only in that two frames $a$ are employed in place of the one shaking frame and the said frames $a$ are operated by eccentrics $f$ placed on the shaft $g$ at an angle of 180° to each other. The molds $i$ filled with material are placed on both shaking frames $a$ transversely to the shaking beams $e$.

Having now particularly described and ascertained the nature of our said invention and in what manner the same is to be performed, we declare that what we claim is:—

1. In a shaking machine of the character described, a plate, supporting legs therefor, said legs being spaced from one another, supports upon which said legs normally rest, a rocking beam positioned below said plate and pivotally mounted upon a horizontal axis at a point between said legs, projections on said legs adapted to be engaged by said rocking beam, whereby rocking movement of said beam will alternately raise the ends of the plate, and means for imparting a rocking movement to said beam.

2. In a shaking machine of the character described, a plate, supporting legs therefor, said legs being spaced from one another, supports upon which said legs normally rest, a rocking beam positioned below said plate and pivotally mounted upon a horizontal axis at a point between said legs, said legs being provided with projections free from connection with said beam, but adapted to be engaged thereby, whereby rocking movement of said beam will alternately raise the ends of the plate, and means for imparting a rocking movement to said beam.

In testimony whereof we have signed our names to this specification in the presence of two subscribing witnesses.

ALBERT FRIESECKE.
CARL FRIESECKE.

Witnesses:
HENRY HASPER,
WOLDEMAR HAUPT.

Copies of this patent may be obtained for five cents each, by addressing the "Commissioner of Patents, Washington, D. C."